Dec. 3, 1940.     F. L. MAIN     2,223,424
MASTER CYLINDER
Filed April 18, 1938     2 Sheets-Sheet 1

INVENTOR
FRANK L. MAIN
BY
ATTORNEYS

Dec. 3, 1940.   F. L. MAIN   2,223,424
MASTER CYLINDER
Filed April 18, 1938   2 Sheets-Sheet 2
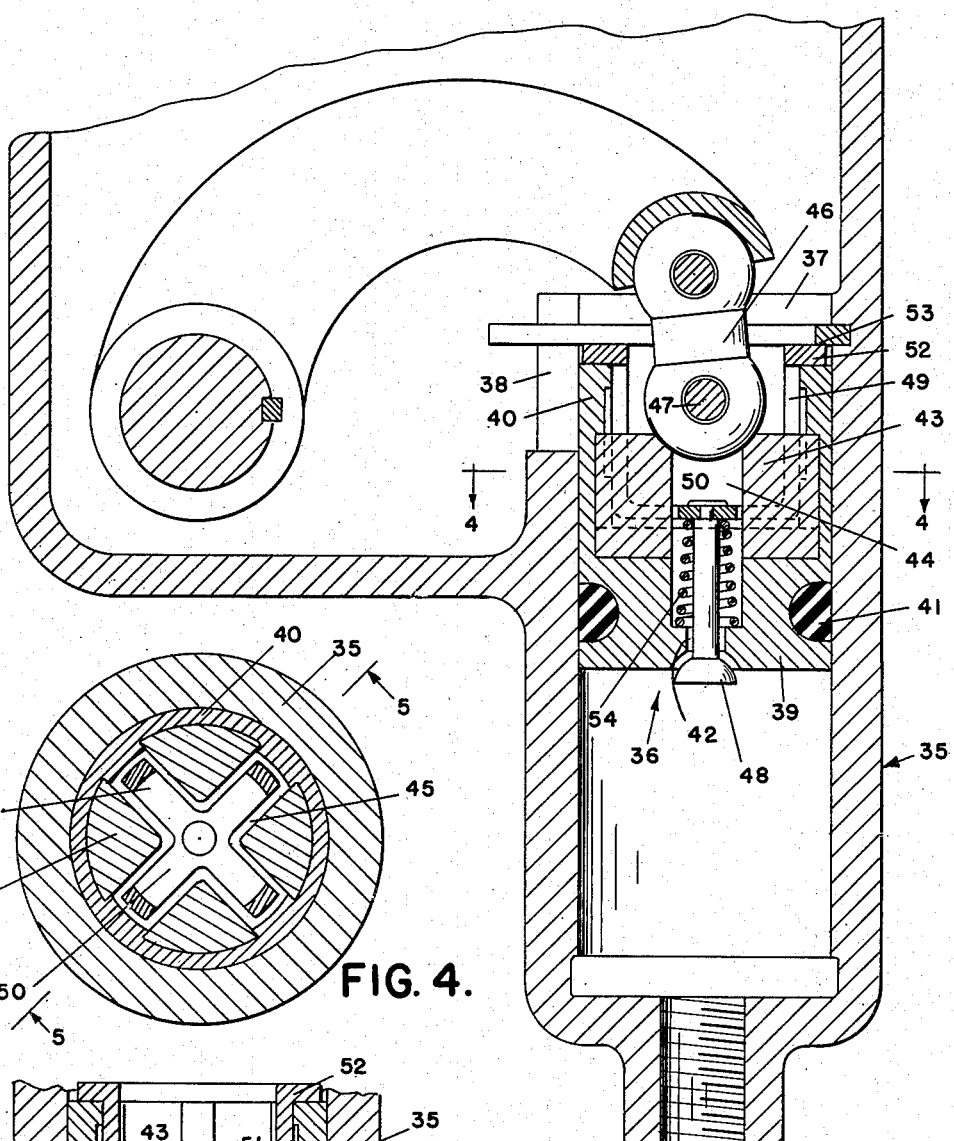
INVENTOR
FRANK L. MAIN
BY *Whittemore Hulbert Belknap*
ATTORNEYS Patented Dec. 3, 1940

2,223,424

UNITED STATES PATENT OFFICE 2,223,424

MASTER CYLINDER

Frank L. Main, Birmingham, Mich., assignor to Kelsey-Hayes Wheel Company, Detroit, Mich., a corporation of Delaware Application April 18, 1938, Serial No. 202,789

13 Claims. (Cl. 60—54.6)

The invention relates to hydraulic brake apparatus and refers more particularly to master cylinders for producing pressure upon braking fluid in braking systems to apply brakes.

The invention has for one of its objects to provide an improved construction of master cylinder of that type in which the piston has a passage therethrough providing for the flow of braking fluid and carries a valve for controlling the passage.

The invention has for other objects to provide a master cylinder with means for positively opening the valve during the final portion of the retractile movement of the piston; and to so construct the master cylinder that the connecting rod extends within the piston and the valve actuating means embraces the connecting rod.

The invention has for other objects the novel features of construction and combinations and arrangements of parts as more fully hereinafter set forth.

In the drawings:

Figure 3 is a view similar to Figure 1 showing another embodiment of my invention;

Figure 4 is a cross section on the line 4—4 of Figure 3;

Figure 5 is a cross section on the line 5—5 of Figure 4.

Figures 1, 2:
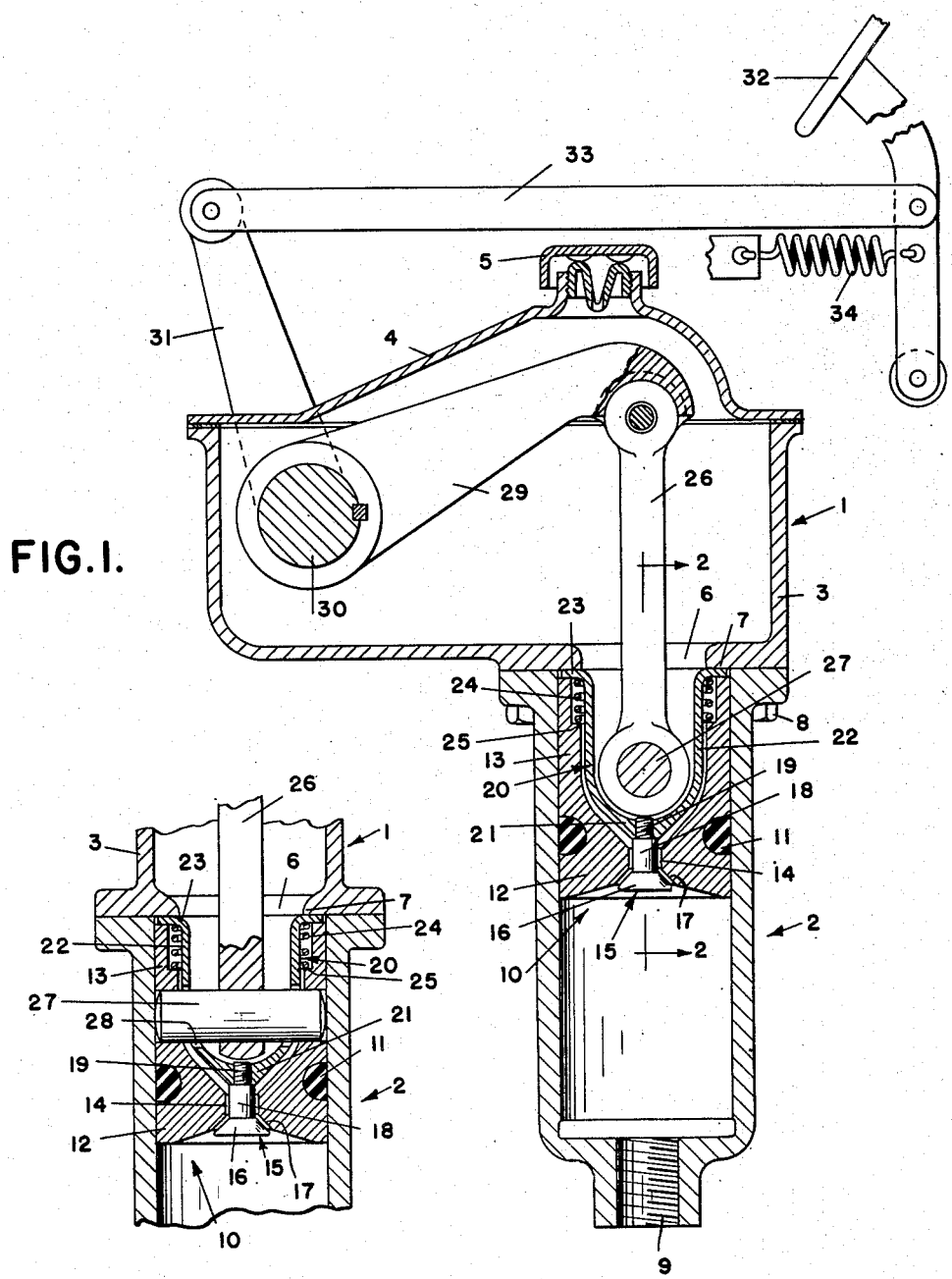
Figure 1 is a vertical section through a master cylinder showing an embodiment of my invention.
Figure 2 is a cross section on the line 2—2 of Figure 1.

The hydraulic brake apparatus embodying my invention is adapted particularly for use with motor vehicles and the master cylinders for producing pressure upon the braking liquid to apply the brakes are operable from the usual foot pedals of the motor vehicles.

Referring to the embodiment illustrated in Figures 1 and 2, 1 is the reservoir of the master cylinder and 2 the cylinder. The reservoir comprises the hollow body 3 having an open upper end and the cover 4 provided with the breather 5 which allows the passage of air to and from the reservoir. The bottom wall of the reservoir body is provided with the opening 6. The cylinder 2 extends substantially vertically with its bore in axial alignment with the opening 6 and of greater diameter to provide the annular shoulder 7 upon the bottom wall of the reservoir body. The cylinder is suitably secured at its upper end to the bottom wall of the reservoir body as by means of the bolts 8. The lower end of the cylinder is provided with the braking fluid port 9 which is adapted to be connected by suitable tubing to the actuators or wheel cylinders for applying the brakes. The braking fluid is a braking liquid, the normal level of which is located near the upper end of the reservoir body.

10 is a piston reciprocable within the cylinder 2 and provided with the annular packing member 11 which is preferably a rubber ring extending within an annular groove in the piston and slidably engaging the cylinder wall. The piston has the head 12 and the skirt 13 extending upwardly from the head. The head is formed with the axial passage 14 which is controlled by the valve 15. The valve has the head 16 at the pressure end of the piston and adapted to engage the seat 17. The valve also has the stem 18 which extends freely upwardly through the passage 14 and is formed with the reduced threaded upper end portion 19. 20 is the member for operating the valve 15. This member is a cup-shaped member which is U-shaped in longitudinal cross section and has the base 21 into which the reduced threaded end portion 19 of the valve stem is screwed. The valve operating member also comprises the tubular portion 22 which extends within the skirt and terminates at its upper end in the annular radially outwardly extending flange 23 beyond the upper end of the skirt and adapted to engage the annular stop shoulder 7 of the reservoir body. 24 is a coil spring within the skirt abutting the annular shoulder 25 upon the skirt and the annular flange 23 and adapted to normally urge the valve operating member in a direction to close the valve.

26 is a connecting rod having its lower end portion extending within the skirt and also within the valve operating member and clearing the latter. The connecting rod is secured to the piston by the pin 27 which extends through the elongated holes or slots 28 in the tubular portion of the valve operating member and into the piston skirt 13. The elongated holes or slots extend longitudinally of the valve operating member and have a length sufficient to provide for the required movement of the valve operating member relative to the piston to move the valve from its closed position to its open position. The connecting rod is pivotally connected at its upper end to the lever 29 which is located within the reservoir and is secured upon the shaft 30 which extends through and is journaled in the side walls of the reservoir body. The shaft has secured to one end thereof outside the reservoir body the lever 31 which is adapted to be actuated by the usual foot pedal 32 through the link 33. The usual spring 34 serves to normally hold the foot pedal in its off or inoperative position.

In operation, it will be seen that with the parts in the positions indicated in Figures 1 and 2 depressing the foot pedal 32 causes advancement of the piston 15. During the initial portion of the advancement the valve and its operating member remain stationary until the valve head engages its valve seat, after which the piston, valve, and associated parts advance as a unit to produce pressure upon the braking liquid to thereby cause operation of the brakes. Upon allowing the foot pedal to return to its off or inoperative position the connecting rod positively retracts the piston and also serves to retract the valve and its operating member by reason of the spring 24. During the final portion of the retractile movement the annular flange 23 of the valve operating member contacts with the annular stop shoulder 7 of the reservoir body so that continued movement of the connecting rod raises the piston relative to the valve thereby causing the valve to open. This places the portion of the cylinder at the pressure end of the piston in communication with the reservoir, clearance being provided between the valve operating member and the piston so that the braking liquid may pass through the elongated openings or slots in the tubular portion of the valve operating member and the clearance space.

If desired, the spring 24 may be calibrated to allow the valve to open when a predetermined degree of vacuum is reached within the cylinder beyond the pressure end of the piston so that the valve may be opened before the flange 23 contacts with the stop shoulder 7. However, it is apparent that positive opening of the valve is assured at all times. Furthermore, it is to be noted that the stop shoulder positively limits the retractile movement of the piston through the flange 23.

In the embodiment illustrated in Figures 3, 4 and 5, the cylinder 35 and also the piston and valve assembly 36 differ from that previously described. The cylinder 35 extends upwardly above the bottom of the reservoir body and has an open upper end 37 and a vertically extending slot 38 in its side wall for placing the cylinder in communication with the reservoir. The piston has the head 39 and the upwardly extending skirt 40 and is provided with the annular packing member 41 located within an annular groove in the head and engaging the wall of the cylinder. The piston is provided with the axial passage 42 extending through the head. 43 is a bearing block formed of better wearing material than that of the piston. This bearing block is anchored within the skirt and abuts the head and is assembled with the piston by casting the latter upon the former. The bearing block is formed with the axial opening 44 therethrough and also with the longitudinally extending radial grooves 45 which open at their upper ends and terminate short of the lower end of the block. These grooves also open into the opening 44. 46 is a connecting rod having its lower end provided with a ball-shaped or spherical surface for engaging a correspondingly-shaped bearing in the bearing block. This connecting rod is positively connected to the piston by the transverse pin 47 which has a loose fit in the connecting rod to assure contact of the connecting rod with the bearing block during the advancement of the piston.

48 is a valve for controlling the passage 42. This valve has a head at the pressure end of the piston engageable with a seat formed on the piston and a valve stem which extends freely upwardly through the passage 42. For operating the valve, there is the cup-shaped member 49 which has the base 50 secured to the upper end of the valve stem and the arms 51 which extend freely longitudinally within the grooves 45 of the bearing block and provide clearance therebetween for the pin 47. The valve operating member also has at the upper ends of the arms the ring 52 which extends over the upper end of the piston skirt and is adapted to engage the stop 53 secured to the cylinder.

For normally holding the valve in closed position, there is the coil spring 54 which encircles the valve stem and abuts the piston head 39 and the base 50 of the valve operating member.

The operation of this master cylinder is substantially the same as that of the previously described master cylinder.

What I claim as my invention is:

1. In a master cylinder, a reservoir, a cylinder communicating at one end with said reservoir and having at the other end a braking liquid port, a piston reciprocable within said cylinder and having a longitudinally extending passage therethrough, a connecting rod for said piston, a valve for controlling said passage, and means extending on opposite sides of said connecting rod and movable independently thereof for operating said valve.

2. In a master cylinder, a reservoir, a cylinder communicating at one end with said reservoir and having at the other end a braking liquid port, a piston reciprocable within said cylinder and having a longitudinally extending passage therethrough, a connecting rod for said piston, a valve for controlling said passage, and a member U-shaped in cross section extending within said piston on opposite sides of said connecting rod, said member being movable relative to said connecting rod to operate said valve.

3. In a master cylinder, a reservoir, a cylinder communicating at one end with said reservoir and having at the other end a braking liquid port, a piston reciprocable within said cylinder and having a longitudinally extending passage therethrough, a connecting rod, a pin for securing said connecting rod to said piston, a valve for controlling said passage, and a member for operating said valve, said member extending on opposite sides of said connecting rod and extending within and being movable relative to said piston and providing clearance for said pin.

4. In a master cylinder, a reservoir, a cylinder communicating at one end with said reservoir and having at the other end a braking liquid port, a piston reciprocable within said cylinder and having a longitudinally extending passage therethrough, a connecting rod for said piston, a valve for controlling said passage, and a cup-shaped member having a base operatively connected to said valve to open the same, said member encircling said connecting rod and extending within and movable relative to said piston and said connecting rod and having a portion engageable with a stop for securing relative movement of said member and piston to open said valve.

5. In a master cylinder, a reservoir, a cylinder communicating at one end with said reservoir and having at the other end a braking liquid port, a piston reciprocable within said cylinder and having a longitudinally extending passage therethrough, a valve for controlling said passage, a bearing block within said piston having longitudinally extending grooves communicating with said passage, a connecting rod engageable with said bearing block to advance said piston, and a member for operating said valve, said member being operatively connected to said valve and having portions extending longitudinally freely within said grooves.

6. In a master cylinder, a reservoir, a cylinder communicating at one end with the reservoir and having at the opposite end a braking liquid port, a piston reciprocable within said cylinder and having a head provided with an axial passage therethrough and having a skirt, a connecting rod extending within said skirt, a valve for controlling said axial passage, said valve having a head at the pressure end of the piston, a cup-shaped member within said skirt having a base secured to said valve and having a free end portion located beyond said skirt, a spring engaging said member and operable to urge said valve to its closed position with relation to the axial passage through the head of the piston, and a stop engageable with the end of said member extending beyond the skirt and effective to unseat said valve when the piston is moved to its extreme retracted position.

7. In a master cylinder, a reservoir, a cylinder communicating at one end with said reservoir and having at the other end a braking liquid port, a piston reciprocable within said cylinder and having a head provided with an axial port and a skirt, a valve controlling said port, a bearing block within said skirt and abutting said head and provided with longitudinally extending radial grooves communicating with said axial port, a connecting rod extending within said skirt and engageable with said bearing block to advance said piston, a cup-shaped member having a base secured to said valve and arms extending longitudinally freely within said grooves, and a spring engaging said member and normally holding said valve in closed position.

8. In a master cylinder, a reservoir, a cylinder communicating at one end with said reservoir and having at the other end a braking liquid port, a piston reciprocable within said cylinder and having a longitudinally extending passage therethrough, a valve controlling said passage, a connecting rod, a pin for securing said connecting rod to said piston, a member for operating said valve extending on opposite sides of said connecting rod and extending within and movable relative to said piston, and a stop associated with said cylinder and adapted to be directly engaged by said member to unseat said valve when the piston is in its retracted position.

9. In a master cylinder, a reservoir, a cylinder communicating at one end with said reservoir and having at the other end a braking liquid port, a piston reciprocable within said cylinder and having a longitudinally extending passage therethrough, a valve controlling said passage, a connecting rod, a pin for securing said connecting rod to said piston, and a cup-shaped member encircling said connecting rod and extending within said piston for operating said valve, said member being provided with diametrically opposite openings through which said pin extends and which provide clearance for said pin permitting movement of said member relative to said connecting rod and said piston.

10. In a master cylinder, a reservoir, a cylinder communicating at one end with said reservoir and having at the other end a braking liquid port, a piston reciprocable within said cylinder and having a longitudinally extending passage therethrough, a bearing block within said piston having a longitudinally extending passage therethrough registering with the passage in said piston, a connecting rod engageable with said bearing block to advance said piston, a valve for controlling the passage in said piston, and a member operatively connected to said valve, said member extending on opposite sides of said connecting rod and being movable relative to said piston and said connecting rod to operate said valve.

11. A master cylinder comprising a reservoir having a hole in one wall, a cylinder having a bore in substantial axial alignment with said hole, the bore of said cylinder being of greater diameter than said hole to form an annular shoulder upon the wall of said reservoir at the adjacent end of said cylinder, a piston in said cylinder provided with a port establishing communication between said reservoir and said cylinder, a connecting rod for advancing said piston, a valve for controlling said port, and a member operatively connected to said valve and having portions extending on opposite sides of said connecting rod engageable with said annular shoulder to unseat said valve when the piston is in its retracted position.

12. A master cylinder comprising a reservoir having a hole in one wall, a cylinder having a bore in substantial axial alignment with said hole, the bore of said cylinder being of greater diameter than said hole to form an annular shoulder upon the wall of said reservoir at the adjacent end of said cylinder, a piston in said cylinder provided with a port establishing communication between said reservoir and said cylinder, a connecting rod for advancing said piston, a valve controlling said port, and a cup-shaped member having its base operatively connected to said valve and its side walls extending on opposite sides of said connecting rod and terminating in an annular flange engageable with said annular shoulder to unseat said valve when the piston is in its retracted position.

13. A master cylinder comprising a reservoir, a cylinder, a piston within said cylinder provided with an axial port for placing the portion of said cylinder at the pressure side of said piston in communication with said reservoir, a valve for controlling said port having a head at the pressure side of the piston and a stem extending through said port, a connecting rod for advancing said piston, a member within said piston operatively connected to said valve stem and having portions extending on opposite sides of said connecting rod, and a stop associated with said cylinder and engageable with said member to unseat said valve when the piston is in its retracted position.

FRANK L. MAIN.